United States Patent [19]

Pacella

[11] 4,192,532
[45] Mar. 11, 1980

[54] FLEXIBLE CONDUIT CONNECTOR

[76] Inventor: Samuel S. Pacella, 14727 Hanfor, Allen Park, Mich. 48101

[21] Appl. No.: 927,470

[22] Filed: Jul. 24, 1978

[51] Int. Cl.² .................. F16L 19/00; F16L 33/00; F16L 33/18; F16L 33/20
[52] U.S. Cl. .................. 285/248; 285/369; 285/382.7
[58] Field of Search .......... 285/382.7, 382.1, 382.2, 285/256, 382, 248, 369, 249, 250, 334.4; 403/280, 285

[56] References Cited

U.S. PATENT DOCUMENTS

| | | | |
|---|---|---|---|
| 1,969,203 | 8/1934 | Cadden et al. | 285/256 X |
| 2,255,673 | 9/1941 | McDermott | 285/382.7 |
| 2,321,260 | 6/1943 | Stecher | 285/249 |
| 2,782,060 | 2/1957 | Appleton | 285/248 |
| 2,862,732 | 12/1958 | Guillou | 285/382 X |
| 3,006,664 | 10/1961 | Appleton et al. | 285/382.7 X |
| 3,030,129 | 4/1962 | Appleton | 285/248 |
| 3,492,410 | 1/1970 | Kelly | 285/248 X |
| 3,917,324 | 11/1975 | Wakatsuki et al. | 285/382.7 X |
| 4,033,614 | 7/1977 | Hanson | 285/382.7 X |
| 4,037,864 | 7/1977 | Anderson et al. | 285/382.7 X |

FOREIGN PATENT DOCUMENTS 280598  9/1965  Australia .................. 285/248

*Primary Examiner*—Casmir A. Nunberg
*Assistant Examiner*—Carl F. Pietruszka
*Attorney, Agent, or Firm*—Whittemore, Hulbert & Belknap

[57] ABSTRACT

A coupling assembly including a double-female connector for connecting two sections of flexible electrical conduit. An internal abutment between the ends of the connector limits the insertion of the conduit sections. The inner surfaces of the connector on both sides of the abutment are tapered to constrict the inserted conduit sections. The connector has external threading on both ends and external flats between the threading to which a wrench may be applied.

1 Claim, 3 Drawing Figures

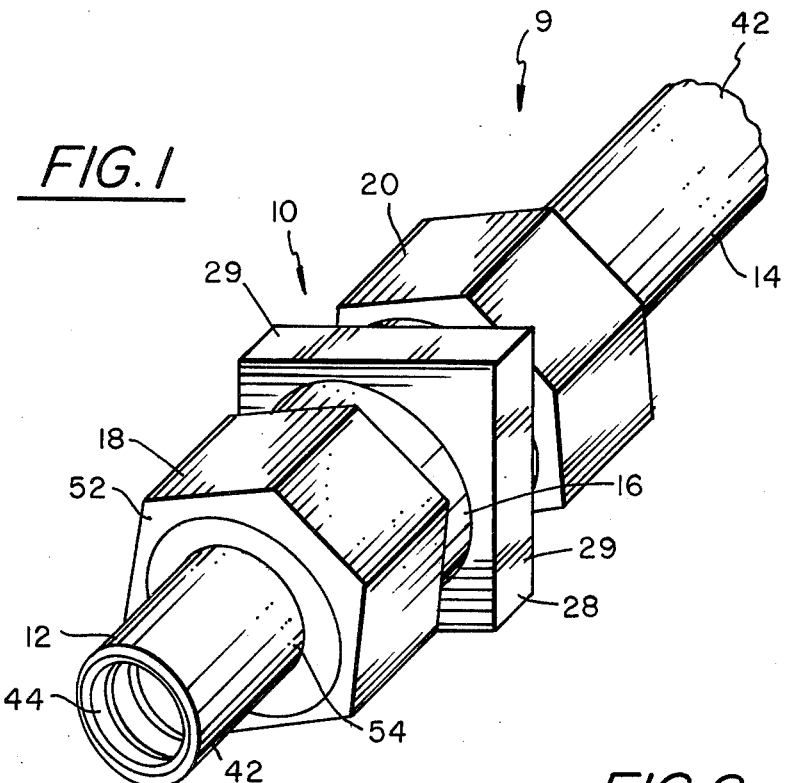
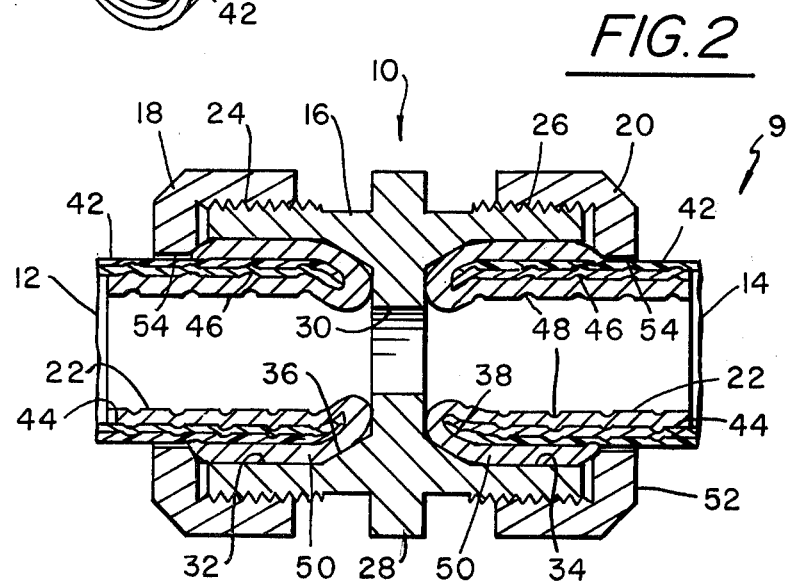
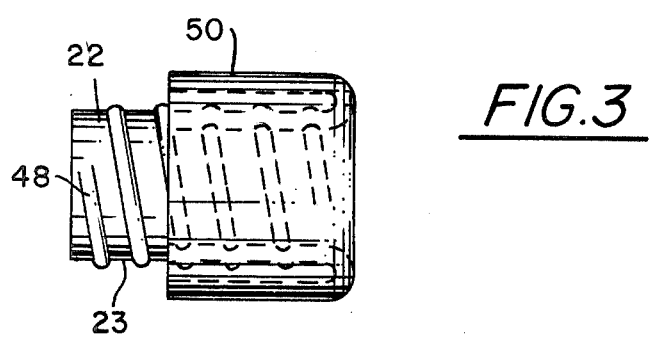

FLEXIBLE CONDUIT CONNECTOR

BACKGROUND AND SUMMARY OF THE INVENTION

Electrical flexible conduit is employed to carry wiring from an electrical box to a switch, solenoid valve, motor or any other electrical apparatus that it is applied to. If it becomes necessary to move the switch or other apparatus, the entire flexible conduit may have to be thrown away and replaced by a longer one.

The present invention makes it possible to add to an existing flexible conduit, with a consequent saving of money and material.

In accordance with the invention, a coupling assembly having a double-female connector is provided for connecting the ends of two flexible conduit sections. A conduit having any number of sections connected end to end by these assemblies is thereby made possible.

Other objects and features of this invention will become more apparent as this description proceeds, especially when taken in conjunction with the accompanying drawings, wherein:

FIG. 1 is a perspective view of a coupling assembly embodying my invention shown joining two sections of flexible conduit.

FIG. 2 is a longitudinal sectional view of the coupling assembly and two conduit sections.

FIG. 3 is a detail of a ferrule applied to the end of a conduit section.

Referring now more particularly to the drawings, there is shown an electrical conduit 9 comprising a coupling assembly 10 joining two flexible electrical conduit sections 12 and 14. The coupling assembly 10 includes a tubular double-female connector 16 and nuts 18 and 20. A ferrule 22 is on the end of each section of conduit. Electrical wiring is adapted to extend through the conduit sections and tubular connector 16.

The connector 16 may be of any size and is a cylindrical tubular member which has external threading 24 and 26 on the ends, and an integral square nut formation 28 between the threading and midway between the ends providing flats 29 to which a wrench may be applied to turn the connector. Obviously the formation 28 may be of hex-shape or any other suitable configuration to which a tool may be applied for turning.

The connector has an integral, radially inwardly projecting, circular rib 30 midway between its ends which provides an internal abutment. The inner surfaces 32 and 34 adjacent each end are cylindrical, that is, they are of uniform circular cross-section throughout their length. Between the cylindrical surfaces 32,34 and the rib 30 are the frusto-conical surfaces 36 and 38 which taper radially inwardly in directions toward rib 30.

The sections of conduit 12 and 14 are tubes 42 of flexible material such, for example, as rubber or plastic, having a suitable liner 44 formed with a spiral groove 46.

There is a ferrule 22 on the end of each conduit section. Each ferrule 22 is a tubular member preferably of metal having an inner sleeve portion 23 formed with a spiral ridge 48. The sleeve portion 23 of the ferrule can be screwed securely into the end of a conduit section with the ridge 48 engaging the groove 46. The outer end of the ferrule is folded back to provide an outer sleeve portion 50 which covers the outer surface of the end of the conduit section. The outside diameter of the sleeve portion of each ferrule approximates the diameter of the inner surfaces 32 and 34 of the connector 16. The inner and outer sleeve portions 23 and 50 are substantially cylindrical from end to end, except at the point of the fold which connects them together.

Nuts 18 and 20 are identical. They are cup-shaped members in which the base 52 of the cup has a central circular hole 54 only slightly larger in diameter than the sections of conduit. The nuts are shown as hex-shaped but may be of any suitable configuration to which a tool may be applied for turning. These nuts thread on the threaded ends of the connector, as shown.

In use, the nuts 18 and 20 are slipped on the conduit sections 12 and 14. The ferrules 22 are threaded into the ends of the conduit sections as far as possible, so that the sleeve portion 50 covers the outer end surface of each conduit section and the end of each conduit section contacts the U-shaped portion of the ferrule between its outer end and its sleeve portion. The ends of the conduit sections with the ferrules applied are then inserted into the ends of the connector 16, after which the nuts 18 and 20 are screwed on the threading 24,26 by tools such as wrenches applied to the nuts and to the square nut formation 28 on the connector 16. As the nuts thread on the connector, the bases 52 of the nuts engage the ends of the sleeve portions 50 of the ferrules to force the ferrule-covered ends of the conduit sections farther into the connector. Finally, the leading ends of the ferrules engage and are constricted or compressed and reduced by the tapered surface portions 36 and 38 and come to rest against the abutment or rib 30 in the relationship shown in FIG. 2. In this position, the leading ends of the inner and outer sleeve portions 23 and 50, including the fold which connects them together, are compressed and deformed radially inwardly to frusto-conical form by the tapered surface portions 36 and 38. (See FIG. 2). The ends of the conduit sections are sealed within the connector 16 against the entry of foreign material and the conduit sections and coupling assembly provide a continuous passage for electrical wiring.

What I claim as my invention is:

1. A coupling assembly including two sections of flexible electrical conduit, a tubular double-female connector which is open at both ends to receive the ends of both sections of conduit, said connector having a radially inwardly projecting circular rib midway between its ends, the inner surfaces of said connector adjacent said rib on both sides thereof being tapered radially inwardly in directions toward said rib, said connector having external threading on both ends and an external formation between said threading to which a wrench may be applied to turn said connector, tubular ferrules each having an inner sleeve portion and an outer sleeve portion, said inner and outer sleeve portions being connected by a fold, the wall portions of said inner and outer sleeve portions of each ferrule adjacent to said fold being cylindrical in the free state condition thereof, said ferrules being assembled with said respective conduit sections by having the inner sleeve portion of each ferrule fitted into an end of the associated conduit section and the outer sleeve portion thereof extending along the outer surface of said conduit section with said fold extending across the end edge of said conduit section, said ends of said conduit sections with said ferrules assembled therewith as aforesaid being inserted respectively in the ends of said connector, and nuts threaded on the threading on the ends of said connector and engaging said outer sleeve portions of said ferrules to clamp said ends of said conduit sections within said ends of said connector under sufficient pressure to cause said folds of said ferrules to abut said rib and said wall portions thereof to be compressed and deformed radially inwardly to frusto-conical form by the tapered inner surfaces of said connector and form a seal therewith.

* * * * *